United States Patent [19]

Yasnovsky et al.

[11] 4,336,370

[45] Jun. 22, 1982

[54] PROCESS FOR ACTIVATING CELLULOSE PULP TO IMPROVE EASE OF ESTERIFICATION

[75] Inventors: V. M. Yasnovsky, Sloatsburg; Donald M. MacDonald, Monroe, both of N.Y.

[73] Assignee: International Paper Company, New York, N.Y.

[21] Appl. No.: 132,913

[22] Filed: Mar. 24, 1980

[51] Int. Cl.$^3$ .................................................. C08B 1/02
[52] U.S. Cl. ......................................... 536/58; 536/70; 536/71
[58] Field of Search .......................... 536/58, 70, 71

[56] References Cited

U.S. PATENT DOCUMENTS

| | | | |
|---|---|---|---|
| 1,783,184 | 12/1930 | Dreyfus et al. | 536/71 |
| 4,016,353 | 4/1977 | Goheen et al. | 536/58 |

FOREIGN PATENT DOCUMENTS

| | | | |
|---|---|---|---|
| 986101 | 3/1976 | Canada | 536/71 |
| 237567 | 11/1925 | United Kingdom | 536/71 |
| 300824 | 11/1928 | United Kingdom | 536/71 |
| 335954 | 7/1969 | U.S.S.R. | 536/71 |

OTHER PUBLICATIONS

Nelson et al., Preprints of a Technical Association of the Pulp and Paper Industry (Tappi), Dissolving Pulp Conference, Atlanta, Georgia, Oct. 24 to 26, 1976, pp. 69-82.
Kuznetzova et al., Journal of Applied Chemistry of the USSR, vol. 37, pp. 399-408 (1964).

*Primary Examiner*—Ronald W. Griffin
*Attorney, Agent, or Firm*—Royal E. Bright; Walt Thomas Zielinski

[57] ABSTRACT

Treatment of dissolving pulp derived from wood with small quantities of $C_2$–$C_{18}$ carboxylic acids and subsequent storage of the treated pulp, under conditions where little acid evaporation can occur, for periods of about two hours or more results in a product which has more uniform reactivity toward standard activation techniques in subsequent esterification reactions which produce known cellulose esters. At certain concentrations conventional activation techniques may be dispensed with.

13 Claims, No Drawings

PROCESS FOR ACTIVATING CELLULOSE PULP TO IMPROVE EASE OF ESTERIFICATION

BACKGROUND OF THE INVENTION

This invention relates to compositions of matter classified in the art of chemistry as cellulose esters, and to processes for their preparation.

Esterification of dissolving pulps has been found in commercial practice to require that the pulps be activated prior to esterification. Properly prepared kraft dissolving pulps intended for acetylation and other esterification processes perform ideally in those processes which employ good activation. Ideal performance is measured by the formation of cellulose ester solutions which are readily filtered, have relatively little color and low levels of turbidity. Without such activation or with incomplete activation poor solution homogeneity with increased turbidity due to suspended fibers results. This is primarily due to lack of sufficient reactivity in portions of the pulp mass. It has been established with a high degree of certainty that the poorly reactive regions result from a necessary step of the pulp purification process, a treatment with sodium hydroxide, particularly cold, strong sodium hydroxide solutions of near mercerizing strength (90–120 g/l), to remove non-cellulosic carbohydrates.

Activation may be performed, at the convenience of the processor either in separate vessels from or in the same vessels as the subsequent esterification reaction. Numerous ways of performing the activation step have been proposed. Commercially, however, activation processes employ the treatment of pulp with about 30 to 500 weight percent acetic acid (on a dry pulp basis). These processes may be divided into three general types which may be more specifically categorized as "good" activation processes, a classification into which two of the three general processes fall, and "poor" activation types, a classification into which the third general process falls.

The "good" processes employ relatively little acetic acid, about 35% to 50% on pulp weight, at from 30° to 100° C. either in the form of 50% to 90% on pulp weight of aqueous acetic acid followed by replacement with glacial acetic acid or from 30% to 50% on pulp weight glacial acetic acid at 20° to 80° C. for from 30 to 90 minutes. The "poor" process employs a large excess of glacial acetic acid (250% to 500% on pulp weight) at 20° to 50° C. for from 10 to 90 minutes.

The broad limits for the above-mentioned activation processes reflect the variations among pulps. As one would expect, bleached dissolving pulp obtained from hardwood differs in behavior from that derived from softwood. Pulp obtained by sulfite processes differs from that obtained by sulfate (kraft) processes. Pulp purified with cold alkali requires more severe conditions (higher temperature and/or longer treatment times) for good activation than does pulp purified with hot alkali.

The "poor" activation process is well suited to bleached sulphite softwood dissolving pulps but with bleached kraft dissolving pulps, particularly those from hardwoods which require the aforementioned cold alkali purification, excessive turbidity and color, as well as, reduced ease of filterability in acid and acetone dopes of the final esterified product are encountered.

Modifications of the activation process in a commercial plant to accommodate different pulp types can require expensive equipment modification or replacement. It is, therefore, more desirable to modify dissolving pulps which have previously been considered by industry to require the good activation procedures for satisfactory esterification so that they are capable of providing adequate properties when esterified in plants wherein the equipment is designed for poor activation.

The successful adaptation of kraft hardwood dissolving pulp to poor activation processes would allow the use in plants limited to poor activation of a broader base supply of pulp and overall more economical use of wood resources as kraft pulps are obtained in higher yield from the tree than sulphite pulps.

CITATION OF RELEVANT LITERATURE

Of work directed toward improvements in cellulose activation processes applicants consider the following to be the most relevant and material literature.

Russell Nelson and Jones C. Williams in Preprints of a Technical Association of the Pulp and Paper Industry (TAPPI), Dissolving Pulp Conference, Atlanta, Ga., Oct. 24 to 26, 1976, pp. 69 to 82 describe the activation of cellulose dissolving pulp. This paper describes dampening pulp with acetic acid (0.5 parts acetic acid is mentioned) which is then immediately followed by mechanical refining to restore acetylation behavior to the level obtained by "standard" acetic acid activation. This paper considers the mechanical energy supplied by the refining process to be essential to successful activation with the amounts of acetic acid employed.

E. Kuznetzova and N. Klenkova in Journal of Applied Chemistry of the USSR, Vol. 37, pp. 399–408 (1964) describe cellulose activation as a relaxation process in conformity with the major portion of the literature stating that two hours is sufficient time to reach the maximum. They describe an experiment (p. 405, sentence beginning line 10 from bottom, continuing to top of p. 406, line 5) wherein cellulose was placed in a desiccator and acetic acid placed in the bottom reservoir, the cover placed on, and the dessicator placed in a water bath at 50° C. The acetic acid vapors condensed on the cellulose. By varying water content and cellulose temperature to control the amount of acetic acid condensation and duration a set of optimum parameters to induce good reactivity were found, namely 7% to 8% water content, 30° to 35° activation temperature, two hours duration, amount of acetic acid on cellulose not lower than 13% to 15%.

U.S. Pat. No. 4,016,353 suggests confrication in the presence or absence of acetic anhydride as the activation step for acetylation.

Applicants' process does not require mechanical energy for successful activation and employs quantities less than the minimum previously suggested as necessary to provide cellulose pulps with uniform behavior in commercial activation and esterification processes. Higher yield kraft pulp may, therefore, be employed in processes formerly restricted to premium sulfite pulps.

SUMMARY OF THE INVENTION

The invention provides a process for preparation for esterification of dissolving pulp derived from wood pulp wherein no further mechanical refining is required which comprises:

(a) treating dissolving pulp in slurry, sheet or flake form with 0.5% to 10% on an oven-dry pulp weight basis of a carboxylic acid of from 2 to about 18 carbon atoms; and (b) for at least two hours prior to initiation of conventional esterification procedures maintaining the carboxylic acid-dissolving pulp mixture produced in step (a) above under conditions wherein substantial loss of carboxylic acid is prevented.

The tangible embodiments produced by this process aspect of the invention possess the inherent applied use characteristics of being uniformly reactive pulps suitable for further processing in known cellulose esterification procedures but employing poor or no activation to produce cellulose esters substantially similar to cellulose esters produced by those same processes after conventional activation for the particular type of pulp. The final products are useful in the preparation of filaments, lacquers and coatings as well as cast and molded three dimensional objects. In the concentration range above about 5% by weight on pulp, surprisingly no other activation treatment is required for hot alkali purified pulp and in the concentration range above about 6%, no further activation is required for cold alkali purified pulp.

The invention also provides in a process for the preparation for esterification of dissolving pulp derived from wood pulp and wherein said dissolving pulp prior to esterification is dried to less than 10% moisture content on an oven-dry pulp basis the improvement comprising:

(a) prior to the initiation of conventional esterification procedures, including the initiation of any desired activation process, treating said dissolving pulp in slurry, sheet or flake form with from 0.5% to 10.0% on an oven-dry pulp weight basis of a carboxylic acid of from 2 to about 18 carbon atoms; and (b) for at least about two hours prior to the initiation of esterification procedures maintaining the carboxylic acid pulp mixture so produced in step (a) above under conditions such that substantial loss of carboxylic acid is prevented.

DESCRIPTION OF THE PREFERRED EMBODIMENTS

The manner of practicing the processes of the invention will now be specifically illustrated with reference to a particular embodiment thereof, namely the preparation of cellulose acetate (I) from a dissolving pulp containing absorbed octanoic acid (II) obtained by treating a hardwood sulfate (kraft) pulp (III) with octanoic acid (IV).

To prepare I, IV may be added to an aqueous slurry of III, the water and unabsorbed IV drained off in the usual fashion during formation of a sheet of II, which may then be dried in the usual fashion on a hot surface, and then acetylated in standard fashion to produce I. A convenient method of acetylation is to treat dried II with glacial acetic acid, conveniently about 350% on a pulp weight basis, for a short period of time, conveniently about ten minutes, at elevated temperature, conveniently about 38° C., followed by treatment with concentrated sulfuric acid 0.5 to 1.0% on a pulp weight basis, for a moderate period of time, conveniently about 20 minutes, at ambient temperature, about 20° C., then by treatment with excess acetic anhydride, conveniently 220% by weight for a moderate period of time, conveniently about 20 minutes at ambient temperature, about 20° C., then concentrated sulfuric acid, conveniently about 7.2% by weight, for a moderate period of time, conveniently about 20 to 30 minutes, at ambient temperature, about 20° C. The reaction may be quenched by addition of 50% aqueous acetic acid in standard fashion and I precipitated by pouring the reaction mixture into 10% aqueous acetic acid.

As III must be cold alkali purified, at concentration levels of above about 6% IV in III one may commence the acetylation of II at the acetic anhydride addition stage with the initial activation steps omitted. For other pulp types purified by hot alkali treatment, if the concentration of IV in III is above about 5% acetylation of II may be started at the acetic anhydride addition stage and the initial activation steps omitted.

One skilled in the art will recognize that in addition to the octanoic acid illustrated for the practice of the invention, any carboxylic acid of from 2 to about 18 carbon atoms straight chain, branched chain or cyclic, liquid or solid, saturated or unsaturated, such as, acetic, propionic, butyric, phthalic, maleic, isovaleric, caproic, caprylic, capric, lauric, myristic, palmitic, stearic, $\Delta^9$-decylenic, stillingic, $\Delta^9$-dodecylenic, palmitoleic, oleic, ricinoleic, petroselinic, vaccenic, linoleic, linolenic, eleostearic, licanic, parinaric, or mixtures thereof.

It will also be obvious that the acid may be applied to the pulp either by addition to an aqueous slurry of the pulp prior to sheet formation or by spraying the acid in liquid form (neat, if liquid, or in an appropriate solvent such as water, if liquid or solid) onto the sheet or flakes formed therefrom. It is readily apparent that, if applied before drying, solid or less volatile acids will be preferred whereas, if application is to be after drying, liquid acids not requiring a solvent will be preferred.

It will also be obvious that, if they are added to wet pulp, carboxylic acid anhydrides may be substituted for the acids themselves and that they also may be added to the pulp slurry or to the wet sheet or flakes in a fashion similar to that employed for the carboxylic acids. Such acid anhydrides are therefor contemplated as the full equivalents of carboxylic acids herein in the specification and in the appended claims.

The exact quantity of acid or anhydride within the specified ranges is not particularly critical. Uniform behavior in standard esterification processes may be obtained by treatment of the cellulose pulp with from 0.5% to 10% preferably 1% to 3% by weight on an oven-dry pulp basis of the described acids. As stated hereinbefore at higher levels of treatment hot alkali purified dissolving pulps may be treated with greater than 5% by weight, preferably 5% to 6%, on an oven-dry pulp basis and cold alkali purified dissolving pulp may be treated with from 6% to 10% by weight on an oven-dry pulp basis and in addition to being excellently preactivated, pulps so treated will be sufficiently activated that the activation step in conventional esterification procedures may be eliminated. The time for holding the acid containing pulp is similarly not particularly critical. For pulp treated with up to 5% acid, or 6% acid where appropriate, intended for further activation results are obtained with as little as two hours holding although ten hours or longer is usually preferred. For pulps treated with quantities of acid greater than 5%, or 6% where appropriate, wherein subsequent activation is intended to be eliminated, storage of greater than 24 hours is preferred. A maximum holding limit has not been determined but storage for up to ten months in one case has not shown any significant adverse effect. One skilled in the art will, of course, recognize that storage for longer than minimal times should be in sealed or closed areas or containers or under other conditions so that carboxylic acid escape from the pulp will be kept to a minimum. The actual moisture content of the dried pulp is also not especially critical provided a stable shippable form is provided and drying to 6 to 8% moisture content (on an oven-dried pulp basis) in the normal fashion is convenient.

It will be obvious to one of skill in the art that the terms "esterification reaction" and "esterification procedure" as used herein and in the appended claims are intended to and do comprehend any activation step unless the specific context requires differently. It will similarly be obvious to one of skill in the art that enhanced reactivity in a "poor" activation esterification process will in this instance also be reflected in enhanced reactivity in "good" activation processes and that use of the products of this invention in such processes is contemplated by this invention.

The following examples further illustrate the best mode contemplated by the inventors for the practice of their invention.

EXAMPLE 1

Handsheets having a density of 70 g/sq. ft. are prepared employing a standard papermaking mold from a hardwood sulphate pulp having 1% consistency containing octanoic acid (0.2% aqueous solution). After drying on a hot surface in standard fashion at about 140° C. to about 6 to 8% moisture content (by weight based on oven dry pulp), octanoic acid is found retained in the sheet, 1.6% by weight.

EXAMPLE 2

Following a procedure analogous to Example 1, handsheets are prepared from similar hardwood sulphate pulp (0.7% consistency) containing phthalic anhydride (0.28% by weight aqueous solution). The dried sheet retains 0.8% by weight phthalic acid.

EXAMPLE 3

Following a procedure analogous to that of Example 1, handsheets are prepared from a hardwood sulfate pulp (1% consistency). After pressing the wet sheets are sprayed with 3% Hydrofol acid 1095 (95% caprylic acid, Ashland Chemical Co.) on pulp weight and the sheets are then dried in normal fashion on a hot surface. 1.7% acid is retained on the pulp.

EXAMPLE 4

30 g of pulp as prepared in Examples 1, 2 and 3 as well as from other acid treated pulp sheets prepared as specified in Table I are esterified under the following conditions:

Method A

The pulp is activated by immersion in glacial acetic acid (350% on pulp weight) for 10 minutes at 38° C. followed by a pretreatment with concentrated sulfuric acid (0.7% on pulp weight) for 20 minutes at 20° C. A "water killing" step is then performed by immersing the pulp from the sulfuric acid pretreatment step in acetic anhydride (220% on pulp weight) for 20 minutes at 20° C. followed by addition of concentrated sulfuric acid and allowing the reaction to continue at 20° C. for 20 to 30 minutes followed by pouring 50% aqueous acetic acid (185% based on pulp weight) into the reaction mixture which prior to the addition has a 1:8 pulp to liquid ratio.

Method B

This method is analogous to that of Method A except for omission of the initial activation step with acetic acid.

TABLE I

| Sample No. | Type of Pulp | Acid Treatment |
|---|---|---|
| 1 | Softwood Sulfite Pulp-Mill Sheet (Hot alkali purified) | None (control) |
| 2 | Softwood Sulfite Pulp-Mill Sheet (Hot alkali purified) | Sprayed with 6% (pulp weight) acetic acid held sealed for 24 hours |
| 3 | Hardwood Sulfate Pulp-Mill Sheet (Cold alkali purified) | None (control) |
| 4 | Hardwood Sulphate Pulp-Laboratory Hand Sheet Dried on Hot Surface (Cold alkali purified) | None (control) |
| 5 | See Example 1 | |
| 6 | See Example 2 | |
| 7 | See Example 3 | |
| 8 | Hardwood Sulfate Pulp-Mill Sheet (Cold alkali purified) | Sprayed with 2% acetic acid (pulp weight) held sealed for 18 hours |
| 9 | Hardwood Sulfate Pulp-Mill Sheet (Cold alkali purified) | Sprayed with 2% acetic acid (pulp weight) and held sealed for ten months |
| 10 | Hardwood Sulfate Pulp-Mill Sheet (Cold alkali purified) | Sprayed with 8% (pulp weight); Mixture of acetic acid and Hydrofol acid (25:75); Stored open for two weeks |
| 11 | Hardwood Sulfate Pulp-Mill Sheet (Cold alkali purified) | Sprayed with 8% (pulp weight) butyric acid kept sealed two weeks |

The esterification method employed for each sample, the properties of the "acid dope" obtained at the end of the esterification procedure after hydrolysis at 44° C. for 16 hours, 40 minutes, as well as, "acetone dopes" prepared by pouring the acid dopes into a large excess (2 liters if 30 g of pulp is initially employed) of 10% aqueous acetic acid, washing (water) and drying of the flakes so produced (72 hrs. at 40° C.) then dissolving the dry flakes at 16% concentration in acetone are tabulated in Table II.

Turbidity and color of acid and acetone dopes are determined employing a Bausch and Lomb Spectronic 20 colorimeter. Viscosity of acid dopes is determined employing a Brookfield viscosimeter (Spindle No. 6). Viscosity of acetone dopes is determined employing the "ball fall" procedure (time required for a 3/32 inch stainless steel ball, Atlas Ball Code 4E44, to fall 15 cm through the solution). Filterability of acetone dopes is determined employing filtration of the dope through Johnson and Johnson C-14 cloth (5/16th inch opening, 30 psi pressure). Data obtained is converted to standard values according to the "Standard Law of Filterability" [Hermans, P. H. and Bredee, M. L., Rec. Trav. Chim., 54, 680 (1935)].

TABLE II

| Sample No. | Esterification Method | Duration of Esterification Reaction to Termination min. | Acid Dope Properties ||||| Acetone Dope Properties ||||
|---|---|---|---|---|---|---|---|---|---|---|
| | | | Turbidity (Absorbance at 625 nm) | Color (Absorbance at 425–625 nm) | Viscosity After Termination cps | Viscosity After Hydrolysis cps | Turbidity (Absorbance at 625 nm) | Color (Absorbance at 425–625 nm) | Viscosity bfs | Filtration g/cm$^2$ |
| 1 | A | 31±6 | 7.6±1.7 | 17.5±1.3 | 360±70 | 150+40 | 12.5±5.1 | 13.8±5.0 | 13.3±5.1 | 82±46 |
| 2 | B | 35 | 21.2 | 27.9 | 170 | 22 | 36.3 | 41.7 | 4.3 | 55.1 |
| 3 | A | 27±2.5 | 32.0±2.6 | 26.9±1.3 | 400+ | 180±35 | 40.1±6.5 | 30.1±1.9 | 24.3±4.8 | 10.9±2.4 |
| 4 | A | 23 | 26.9 | 29.3 | 442 | 176 | 28.5 | 27.4 | 12.1 | 12.7 |
| 5 | A | 25 | 24.8 | 26.3 | 362 | 163 | 22.1 | 24.8 | 10.7 | 18.5 |
| 6 | A | 26 | 22.1 | 26.8 | 388 | 171 | 22.3 | 25.1 | 9.9 | 18.1 |
| 7 | A | 26 | 22.3 | 28.1 | 378 | 170 | 22.5 | 27.8 | 10.4 | 18.5 |
| 8 | A | 25 | 20.1 | 23.9 | 405 | 150 | 22.5 | 26.0 | 10.5 | 18.5 |
| 9 | A | 24 | 18.9 | 27.1 | 365 | 150 | 22.1 | 23.1 | 10.1 | 25.3 |
| 10 | B | 30 | 37.4 | 41 | 364 | 162 | 73 | 30.0 | 11.2 | 11.0 |
| 11 | B-Butyric anhydride substituted for acetic anhydride | 45 | 29.4 | 27.8 | 295 | 158 | 37.4 | 45.4 | 10.7 | 15.3 |

It is readily seen from the data that Sample 2, a softwood sulfite pulp, upon pretreatment with 6% acetic acid is acetylated without preactivation and gives acetone dope filtration values on the order of magnitude of Sample 1, a control sample treated in conventional fashion.

Samples 3 and 4 hardwood sulfate pulp, cold alkali purified, show that, when esterified in the poor activation process of these examples, such pulps give low acetone dope filtration values and Sample 3 especially shows high acetone dope turbidity. Sample 10 stored under conditions wherein a substantial quantity of the treating acids may be expected to be lost from the pulp shows similar behavior even though the initial quantity of acid employed, as shown by Example 11 would have been sufficient to give acceptable values for acetone dope turbidity and filtration even without activation. Samples 5, 6, 7, 8 and 9 show that both mill sheets and laboratory hand sheets can show acceptable acetone dope turbidities and filtration values in poor activation processes provided the preactivation process of this invention is employed. Example 11 also illustrates that the processes of this invention are not limited solely to acetylation but are more generally applicable to processes for the esterification of dissolving pulp from wood pulp.

The subject matter which applicants regard as their invention is particularly pointed out and distinctly claimed as follows:

1. A process for the preparation for esterification of dissolving pulp derived from wood pulp wherein no further mechanical refining is required which comprises:
   (a) treating dissolving pulp in slurry, sheet or flake form with 0.5 to 10% on an oven dry pulp weight basis of a carboxylic acid, of from 2 to about 18 carbon atoms; and
   (b) for at least two hours prior to initiation of conventional esterification procedures maintaining the carboxylic acid-cellulose pulp mixture produced in step (a) above under conditions wherein substantial loss of carboxylic acid is prevented.

2. A process as defined in claim 1 wherein the pulp is dried prior to treatment with carboxylic acid.

3. A process as defined in claim 2 wherein the carboxylic acid is acetic acid.

4. A process as defined in claim 2 wherein the carboxylic acid is a mixture of liquid fatty acids of from 6 to 18 carbon atoms.

5. A process as defined in claim 1 wherein the pulp at the time of addition of carboxylic acid is in the form of an aqueous slurry, a wet sheet or wet flakes.

6. A process as defined in claim 5 wherein the carboxylic acid is selected from phthalic, maleic, or butyric acids.

7. A process as defined in claim 5 wherein the carboxylic acid is added in the anhydride form.

8. A process as defined in claims 1, 2, 3, 4, 5, 6 or 7 wherein the carboxylic acid content on the pulp is from 0.5 to 5.0% on a dry pulp weight basis.

9. A process as defined in claims 1, 2, 3, 4, 5, 6 or 7 wherein the carboxylic acid content on the pulp is above about 5.0% to about 10.0% on a dry pulp weight basis.

10. A process as defined in claim 9 wherein the carboxylic acid content is about 5.0% to about 6.0% on a dry pulp weight basis.

11. A process as defined in claim 9 wherein the carboxylic acid content is about 6.0% to about 10.0% on a dry pulp weight basis.

12. A process as defined in claim 8 wherein the carboxylic acid content is from about 1.0 to about 3.0% on a dry pulp weight basis.

13. In a process for the preparation for esterification of dissolving pulp derived from wood pulp wherein the dissolving pulp prior to esterification is dried to less than 10% moisture content on oven-dry dissolving pulp basis the improvement comprising:
   (a) prior to the initiation of conventional esterification procedures, including the initiation of any desired activation process, treating said dissolving pulp in slurry, sheet or flake form with from 0.5 to 10.0% on an oven-dry pulp weight basis of a carboxylic acid of from 2 to about 18 carbon atoms; and
   (b) for at least two hours prior to the initiation of esterification procedures maintaining the carboxylic acid-dissolving pulp mixture so produced in step (a) above under conditions such that substantial loss of carboxylic acid is prevented.

* * * * *